US009509036B2

(12) United States Patent
Garmong et al.

(10) Patent No.: US 9,509,036 B2
(45) Date of Patent: Nov. 29, 2016

(54) COMMUNICATIONS UNITS WITH HIGH CAPACITY LOW PROFILE ANTENNA ARRANGEMENTS

(71) Applicant: Pioneer Energy Products, LLC, Franklin, PA (US)

(72) Inventors: Victor H. Garmong, Kennerdell, PA (US); Adam G. Felmlee, Clarion, PA (US)

(73) Assignee: Pioneer Energy Products, LLC, Franklin, PA (US)

( * ) Notice: Subject to any disclaimer, the term of this patent is extended or adjusted under 35 U.S.C. 154(b) by 0 days.

(21) Appl. No.: 14/639,242

(22) Filed: Mar. 5, 2015

(65) Prior Publication Data
US 2016/0261019 A1 Sep. 8, 2016

(51) Int. Cl.
*H01Q 1/12* (2006.01)
*E04H 12/18* (2006.01)
*E04H 12/10* (2006.01)
*E04H 12/34* (2006.01)

(52) U.S. Cl.
CPC ............ *H01Q 1/1242* (2013.01); *E04H 12/10* (2013.01); *E04H 12/182* (2013.01); *E04H 12/345* (2013.01); *H01Q 1/1235* (2013.01)

(58) Field of Classification Search
CPC .............. H01Q 1/1242; H01Q 1/1235; E04H 12/345; E04H 12/182; E04H 12/10
USPC .................................................... 52/117, 202
See application file for complete search history.

(56) References Cited

U.S. PATENT DOCUMENTS

| 3,440,659 | A | | 4/1969 | Kreitzberg |
| 3,873,135 | A | | 3/1975 | Kreitzberg |
| 4,135,776 | A | | 1/1979 | Ailawadhi et al. |
| 4,173,385 | A | | 11/1979 | Fenn et al. |
| 4,290,495 | A | * | 9/1981 | Elliston ..................... E21B 7/02 166/77.4 |
| 4,460,895 | A | | 7/1984 | Bert et al. |
| 4,651,099 | A | | 3/1987 | Vinegar et al. |
| 4,709,120 | A | | 11/1987 | Pearson |
| 4,755,630 | A | | 7/1988 | Smith et al. |
| 4,806,703 | A | | 2/1989 | Sims |
| 4,834,604 | A | * | 5/1989 | Brittain ................. E21B 19/155 175/85 |
| 5,137,471 | A | | 8/1992 | Verespej et al. |
| 5,235,133 | A | | 8/1993 | Roth et al. |
| 5,315,794 | A | | 5/1994 | Pearson |

(Continued)

FOREIGN PATENT DOCUMENTS

WO    WO 01/77538 A1    10/2001

*Primary Examiner* — Brian Glessner
*Assistant Examiner* — Paola Agudelo
(74) *Attorney, Agent, or Firm* — K&L Gates LLP

(57) ABSTRACT

A communications unit. At least one example includes a platform that has a tower assembly operably coupled thereto such that tower assembly is movable between a horizontally deployed position and a vertically deployed position relative to the platform. The tower assembly includes a plurality of telescoping tower segments that are movably supported relative to each other such that they may be selectively manually deployed between a retracted position and the horizontally deployed position. The unit may further include a locking assembly that is configured to selectively and individually lock each of the plurality of telescoping tower segments in the horizontally deployed position. A deployment assembly operably interfaces with the tower assembly and is configured to selectively move the tower assembly between the horizontally deployed position and the vertically deployed position.

23 Claims, 10 Drawing Sheets

(56) References Cited

U.S. PATENT DOCUMENTS

| | | | |
|---|---|---|---|
| 5,401,901 A | 3/1995 | Gerry et al. | |
| 5,452,550 A | 9/1995 | Vanesky et al. | |
| 5,487,247 A | 1/1996 | Pigg | |
| 5,522,194 A | 6/1996 | Graulich | |
| 5,545,844 A | 8/1996 | Plummer, III et al. | |
| 5,560,150 A | 10/1996 | Pearson | |
| 5,603,196 A | 2/1997 | Sohlstrom | |
| 5,660,527 A | 8/1997 | Deering et al. | |
| 5,749,178 A | 5/1998 | Garmong | |
| 5,823,749 A | 10/1998 | Green | |
| 6,320,123 B1 | 11/2001 | Reimers | |
| 6,327,957 B1 | 12/2001 | Carter, Sr. | |
| 6,353,419 B1* | 3/2002 | Gates | H01Q 1/1235 343/878 |
| 6,594,960 B2* | 7/2003 | Brittain | E21B 15/00 175/202 |
| 6,612,810 B1 | 9/2003 | Olsen et al. | |
| 6,890,152 B1 | 5/2005 | Thisted | |
| 6,951,082 B2* | 10/2005 | Nelson | E21B 15/00 175/321 |
| 7,046,521 B2 | 5/2006 | Garmong | |
| 7,217,091 B2 | 5/2007 | LeMieux | |
| 7,385,147 B2 | 6/2008 | Garmong | |
| 7,418,820 B2 | 9/2008 | Harvey et al. | |
| 7,688,595 B2* | 3/2010 | Garmong | H05K 9/0001 361/752 |
| 8,046,970 B2* | 11/2011 | Diniz | E04H 12/10 52/123.1 |
| 8,467,741 B2* | 6/2013 | Newman | H01Q 1/1235 455/561 |
| 8,596,978 B2 | 12/2013 | Garmong | |
| 8,826,604 B2* | 9/2014 | Diniz | E04H 12/182 343/883 |
| 8,955,264 B2* | 2/2015 | Edwards | E04H 12/34 52/118 |
| 9,016,004 B2* | 4/2015 | Vogt | E21B 7/023 52/118 |
| 2006/0244264 A1 | 11/2006 | Anderson et al. | |
| 2007/0098555 A1 | 5/2007 | Siegfriedsenf | |
| 2008/0069696 A1 | 3/2008 | Ball | |
| 2008/0180349 A1* | 7/2008 | Newman | E04H 12/182 343/890 |
| 2009/0107945 A1* | 4/2009 | Ehrenleitner | B66C 23/348 212/176 |
| 2014/0062806 A1* | 3/2014 | Higby | H01Q 1/1235 343/713 |

\* cited by examiner

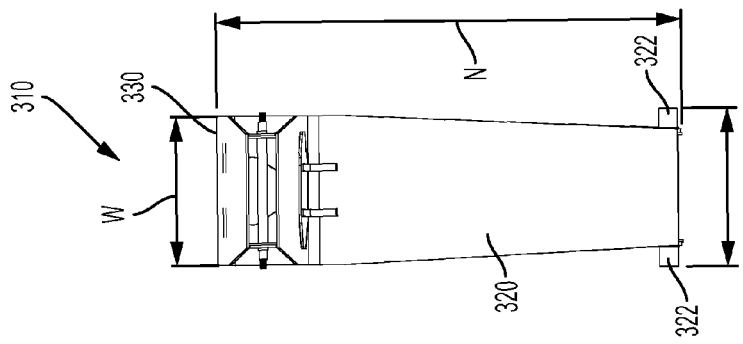
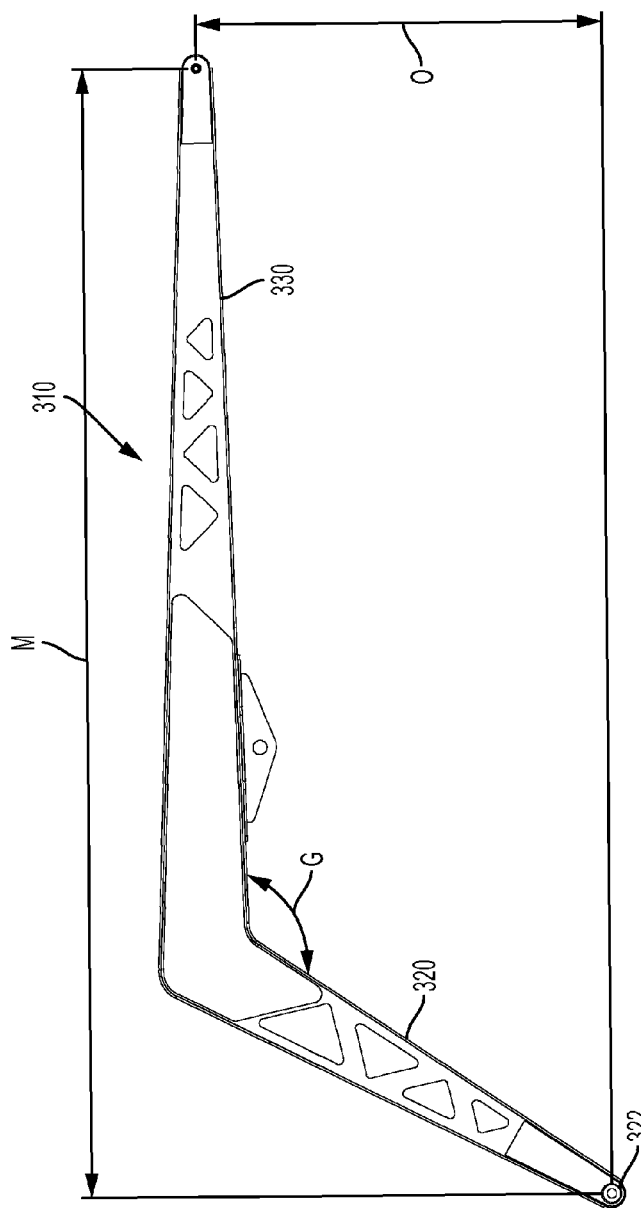
FIG. 16
FIG. 15

COMMUNICATIONS UNITS WITH HIGH CAPACITY LOW PROFILE ANTENNA ARRANGEMENTS

BACKGROUND

The present invention relates to antennas and, in various embodiments, to mobile antenna structures and tower assemblies that are deployable from a low profile configuration for transportation purposes to a deployed configuration.

BRIEF DESCRIPTION OF THE DRAWINGS

The features and advantages of this invention, and the manner of attaining them, will become more apparent and the invention itself will be better understood by reference to the following description of embodiments of the invention taken in conjunction with the accompanying drawings, wherein:

FIG. 4A is an enlarged view of the tension arm arrangement depicted in FIG. 4;

FIG. 15 is a side view of a deployment arm embodiment according to one form of the invention; and FIG. 16 is an end elevational view of the deployment arm of FIG. 5.

DETAILED DESCRIPTION

Figure 1:
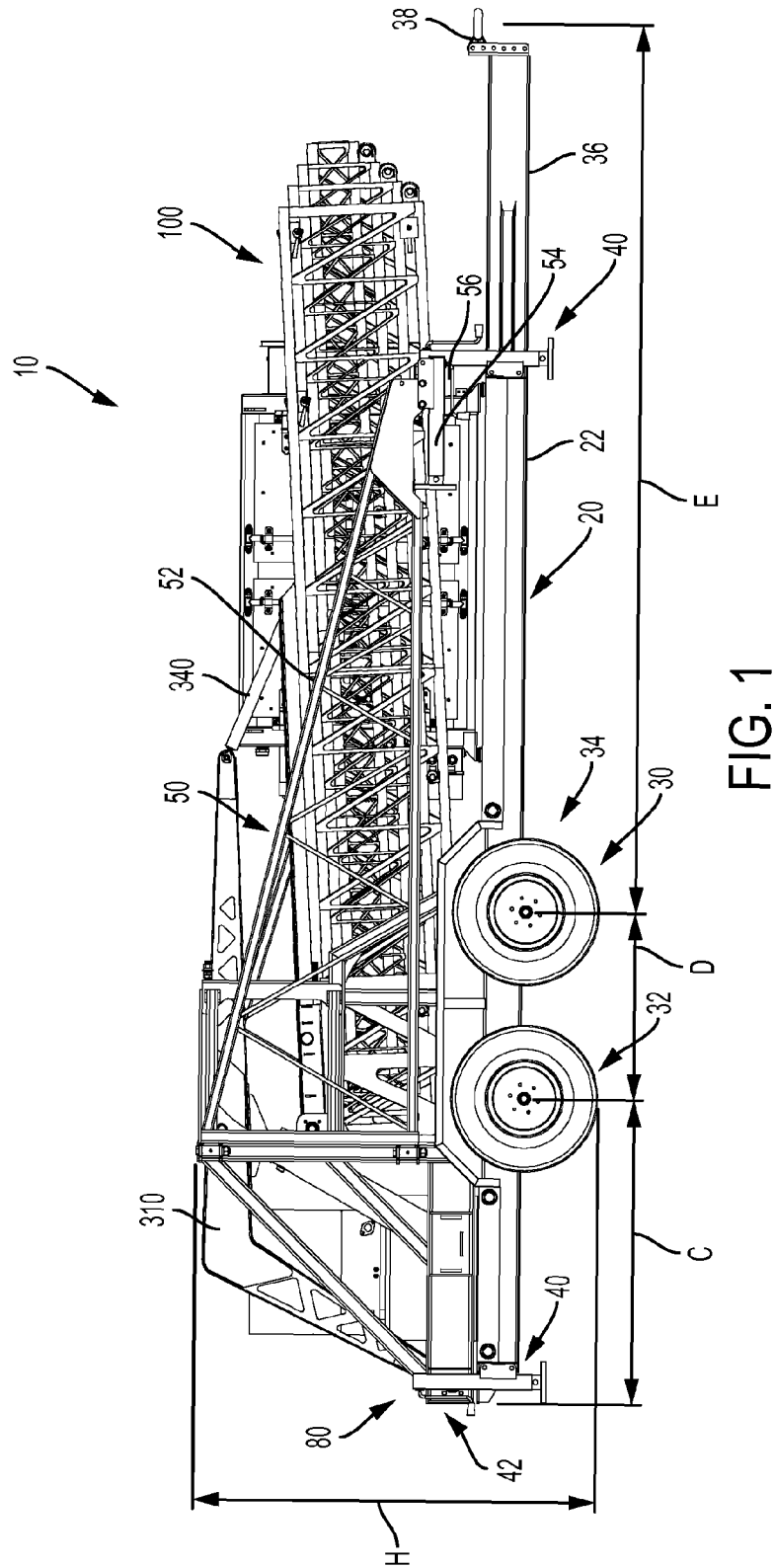
FIG. 1 is a side elevational view of a communications unit of the invention with the tower assembly thereof in a retracted travel orientation.

Applicant of the present application owns the following U.S. patents which are each hereby incorporated by reference herein in their respective entireties:

U.S. Pat. No. 5,749,178, entitled SHIELDED ENCLOSURE;

U.S. Pat. No. 7,046,521, entitled ENCLOSURE WITH SHIELDED POWER COMPARTMENT AND METHODS OF SHIELDING ENCLOSURES;

U.S. Pat. No. 7,385,147, entitled ARTICULATED MAST;

U.S. Pat. No. 7,688,595, entitled SHIELDED CABLE ENTRY PORTS AND ASSEMBLIES; and U.S. Pat. No. 8,596,978, entitled WIND TURBINE.

Electrical components and circuitry, if left unshielded, may be catastrophically damaged by lightning strikes occurring nearby. In addition, electronic equipment that is vital to an area's telecommunication and utility services may be susceptible to radio frequency and electromagnetic interference caused by adjacent equipment or even caused by sabotage if it is unshielded.

There is often a need for portable communication and other electronic equipment that can be used in remote locations while being protected from debilitating damage resulting from lightning strikes. For example, when fighting forest fires in remote locations, firefighting personnel often require the use of electronic communication equipment that, if left unprotected, could be damaged by lightning. Such equipment, due to the remote location in which it is needed, often requires the use of antennas to enable signals to be sent and received. However antennas tend to attract lightning strikes which can damage the communication equipment and render it inoperable. These problems, however, are not confined to firefighting. Similar problems may also be encountered in other settings wherein emergency personnel are responding to disasters and other problems. Moreover, such problems could be encountered by the military.

Remote settings can provide even more challenges. For example, it is often difficult to get the electrical equipment or communications unit into the area where it is most needed and effective. For example, remote mountaintop locations often require the equipment to be transported in by helicopter. Such mode of transportation can be limited by the weight and size of the unit to be transported. Units with smaller footprints and lighter weights are generally easier to maneuver and position from the air. However, remote installations often require large antenna towers to ensure adequate signal transmission. Such larger towers are difficult to assemble, particularly with the limited amount of power available to the unit. For example, such units may be powered by battery units that are charged by on-site wind turbines and/or solar panels/cells. Large towers must also be able to withstand relatively high wind loading that is often associated with remote location installations. This wind loading resistance often dictates that the towers be constructed from heavy steel and/or thick-walled steel mast arrangements. While such construction enables the tower to withstand high wind loading applications, the overall weight and bulk of the tower require the use of extensive tower deployment arrangements which can require significant amounts of power to operate.

A variety of different telescoping mast arrangements have been developed over the years. Such arrangements often suffer from many shortcomings that make them ill-suited for use in remote location settings, however. For example, many telescoping mast arrangements must be extended while all of the separate segments are in their vertical orientation. To accomplish this extension, such mast arrangements often employ cable systems for pulling each mast section into is vertical position. Other arrangements may use separate cylinder arrangements for telescopingly vertically extending each mast section. Such cable and/or cylinder arrangements often require significant amounts of power to operate. These extension systems also add to the overall bulk and weight of the unit making it more difficult to transport the unit to remote locations. In addition, an antenna can only be attached to the vertical-most mast segment thereby preventing the installation of other antennas or components midway or in other positions along the vertically extended mast assembly unless ladders or other means are employed to provide access along the extended mast assembly. Also, the antenna cable must be left on the ground so that it can be paid out as the mast sections are each telescopingly vertically extended. After the mast sections have been vertically extended, the cable is free to whip in the wind unless a ladder or some other form of lifting mechanism is used to enable the installer to gain access to all portions of the extended mast assembly to attach the cable thereto at various points along the extended mast assembly. Furthermore, should it become necessary to access the antenna or otherwise collapse the mast assembly, the user must once again use a ladder or other lifting mechanism to access the antenna cable along the mast to detach it from the mast segments prior to collapsing the mast assembly. When in remote settings, ladders and other lifting equipment may not be present to enable such actions to be accomplished. Furthermore, many conventional telescoping mast arrangements often require the use of guy wires for supporting the mast in its vertically extended position. As will be discussed in further detail below, the various embodiments of the present invention may address at least some, if not all, of these challenges.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments of the present invention is defined solely by the claims. The features illustrated or described in connection with one exemplary embodiment may be combined with the features of other embodiments. Such modifications and variations are intended to be included within the scope of the appended claims.

Reference throughout the specification to "various embodiments," "some embodiments," "one embodiment," or "an embodiment", "an arrangement", "a version" or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures, or characteristics may be combined in any suitable manner in one or more embodiments. Such modifications and variations are intended to be included within the scope of the present invention.

FIGS. 1, 2, 5, 7 and 8, illustrate a portable communications unit 10 that comprises a platform 20. In one embodiment, the platform 20 is relatively portable or "mobile". For example, certain embodiments may be constructed such that they may be transported by truck or other conventional motor vehicles. Other embodiments may be transported to remote locations by, for example, helicopter or fixed wing aircraft. In other embodiments, however, the platform may be designed to be relatively permanent and thus may not be relatively portable. The platform 20 is fabricated from an electrically conductive frame 22 that may be fabricated from, for example, carbon steel, stainless steel, aluminum, and other electrically conductive metal beams, tubing, angles, etc. that may be welded, bolted and/or clamped together. Platform 20 could conceivably be fabricated in a variety of different shapes and sizes. In one embodiment, for example, the platform 20 is approximately 8'-6" wide (dimension "A" in FIG. 2) and 16'-6" long (dimension "B" in FIG. 2). Such dimensions facilitate transport of the platform on highways. It may be advantageous to size the platform 20 such that it is relatively easy to transport with conventional means, yet provides sufficient deck space to support the desired components and enclosures as will be discussed in further detail below.

In the illustrated embodiment, the platform 20 is mounted on a wheeled assembly 30 that includes two wheeled axle assemblies 32, 34. See FIG. 1. A tow bar 36 is attached to the front of the platform 20 to facilitate towing of the unit 10. To facilitate stability of the unit 10 during transport, in the illustrated example, the first wheeled axle assembly 32, is located approximately 4'-10" from the rear of the platform frame 22 (dimension "C" in FIG. 1.). In addition, in the illustrated example, the second wheeled axle unit 34 is located approximately 3' from the first wheeled axle unit 32 (dimension "D" in FIG. 1) which is located approximately 14'-3" from the pin hook 38 on the tow bar 36 (dimension "E" in FIG. 1). Of course, these dimensions may vary with the size and shape of the platform frame and are exemplary in nature and not intended to be limiting. As indicated above, if it is contemplated that the platform 20 will be towed on the highway, the user should ensure that the platform 20 complies with all of the relevant motor vehicle code requirements. For example, the platform 20 may have to be equipped with operable tail lights, license plate holder and lights, reflectors, wheel brakes, etc.

In the illustrated example, a leg assembly 40 is attached to each corner or other portions of the platform frame 22. A leg assembly 40 may be fabricated from the same or similar material comprising the platform frame 22 and be welded, bolted, screwed, etc. thereto. Each leg assembly 40 may be configured to be selectively extended and retracted by a crank arrangement 42. When extended, the leg assemblies 40 serve to support the platform 20 above the ground or other surface and conduct electricity passing through the platform frame 22 (resulting from, for example, a lightning strike) to the ground. In one embodiment, for example, those leg assemblies manufactured by Ralph K. Bodmann Corporation of 1750 Costner Drive, Unit F, Warrington, Pa. 18976 may be employed. In this embodiment, each leg assembly 40 may be bolted to the platform frame 22 or otherwise attached thereto such that electricity will freely pass from the platform frame 22 to one or more of the leg assemblies 40.

Figure 2:
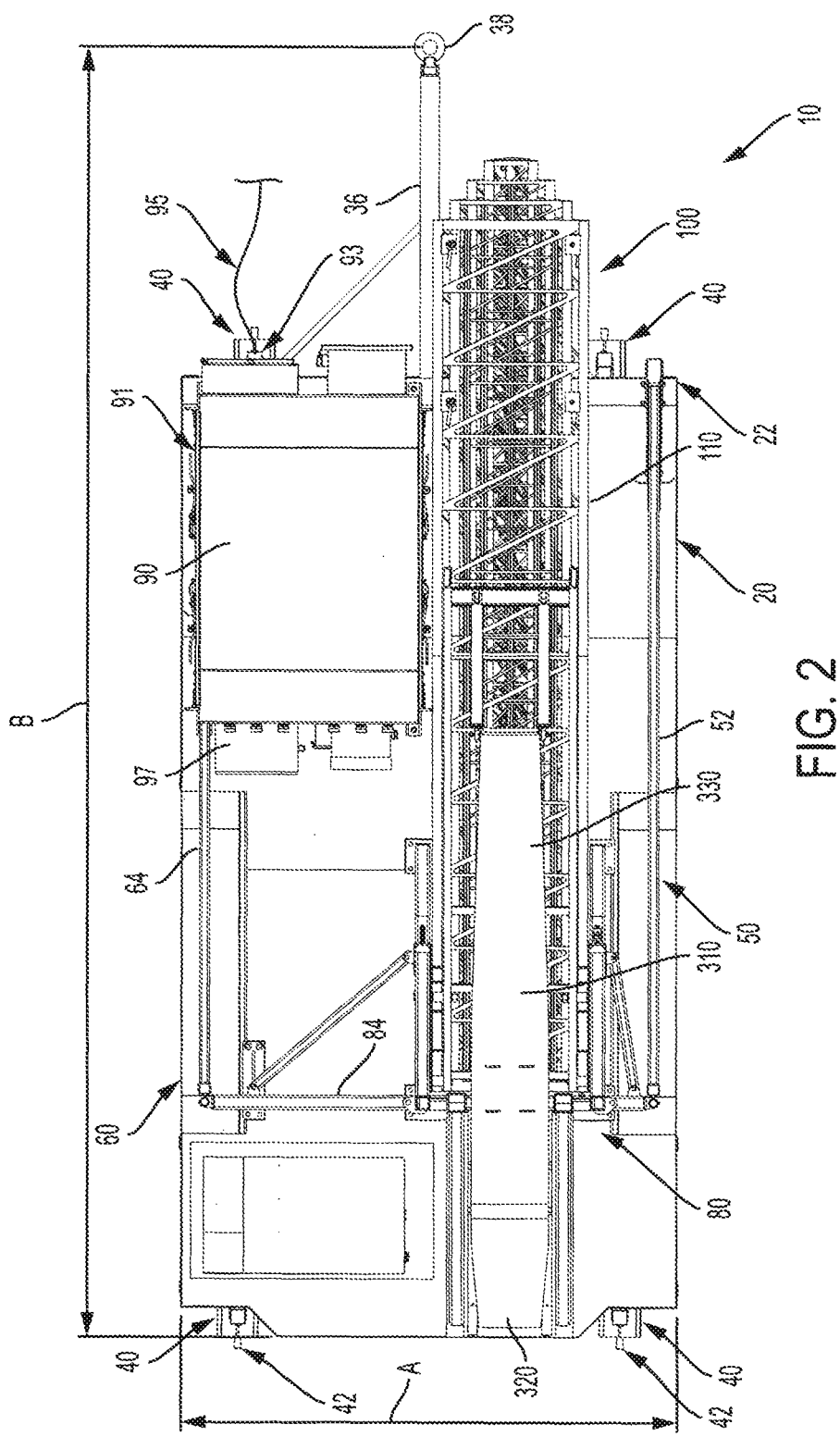
FIG. 2 is a plan view of the communications unit of FIG. 1.
Figure 3:
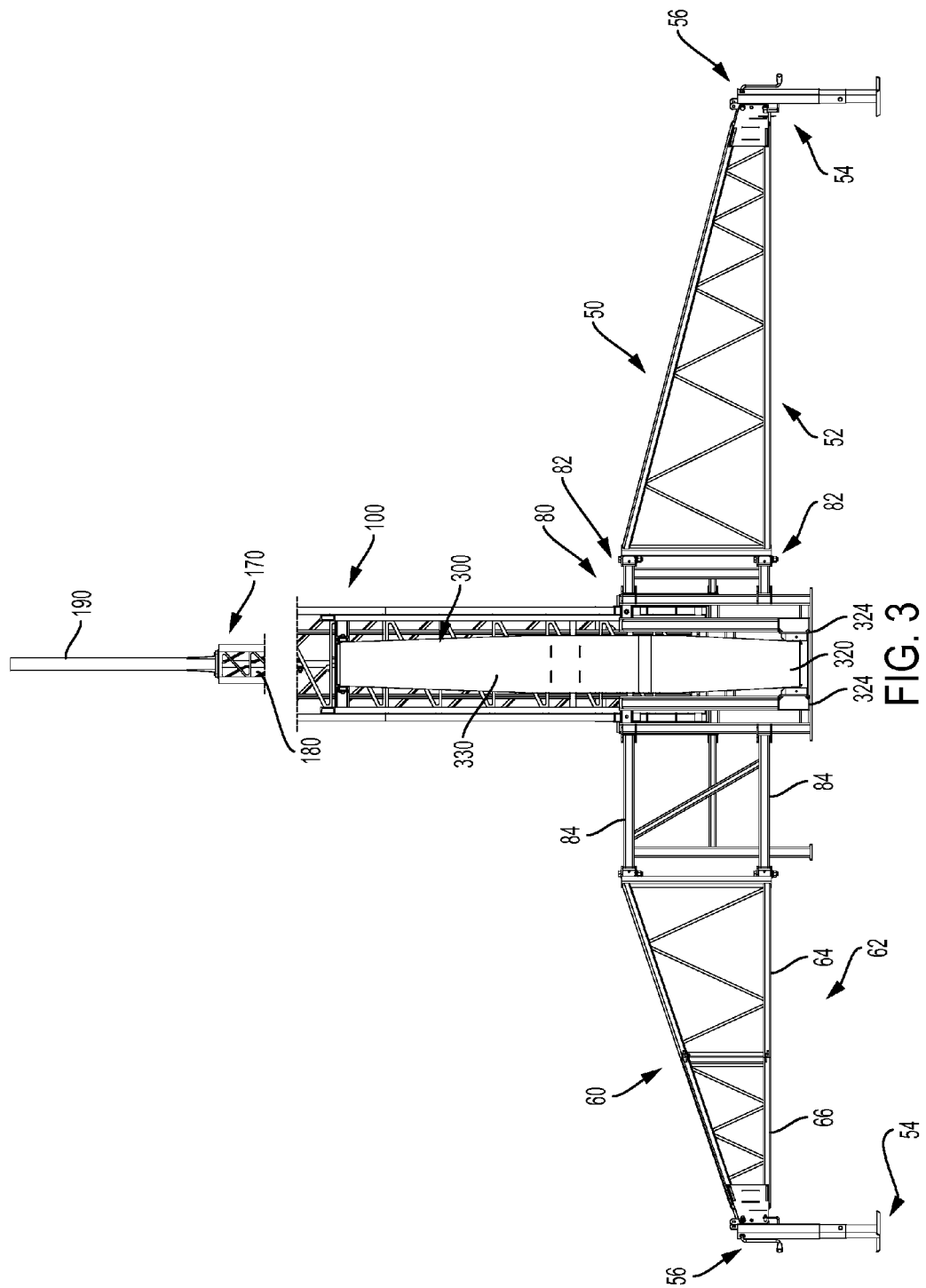
FIG. 3 is an end elevational view of a portion of the communications unit of FIGS. 1 and 2 with the tower assembly in the vertically deployed orientation and with portions of the platform omitted for clarity.
Figure 4:
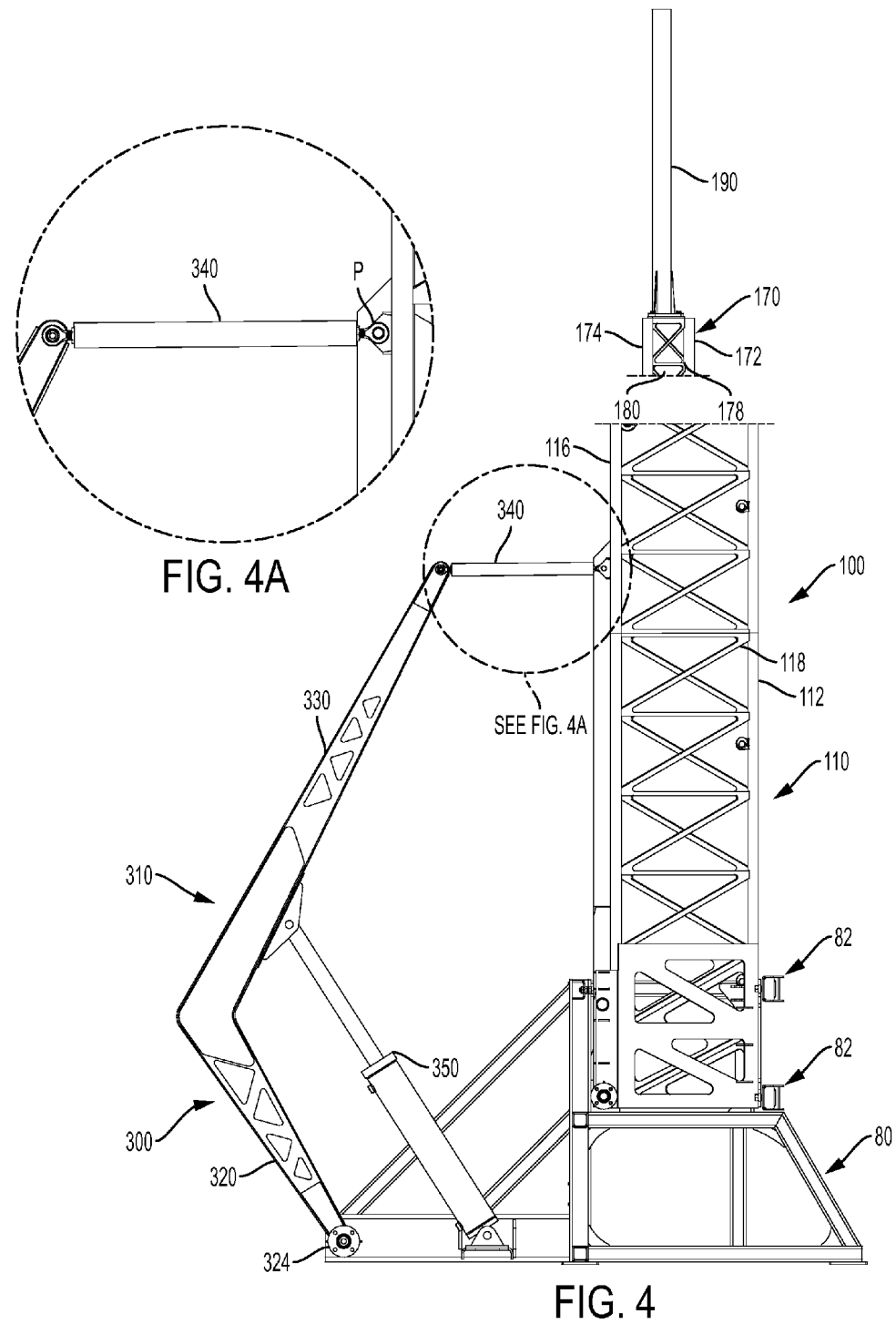
FIG. 4 is a side elevational view of the portions of the communications unit depicted in FIG. 3.
Figure 5:
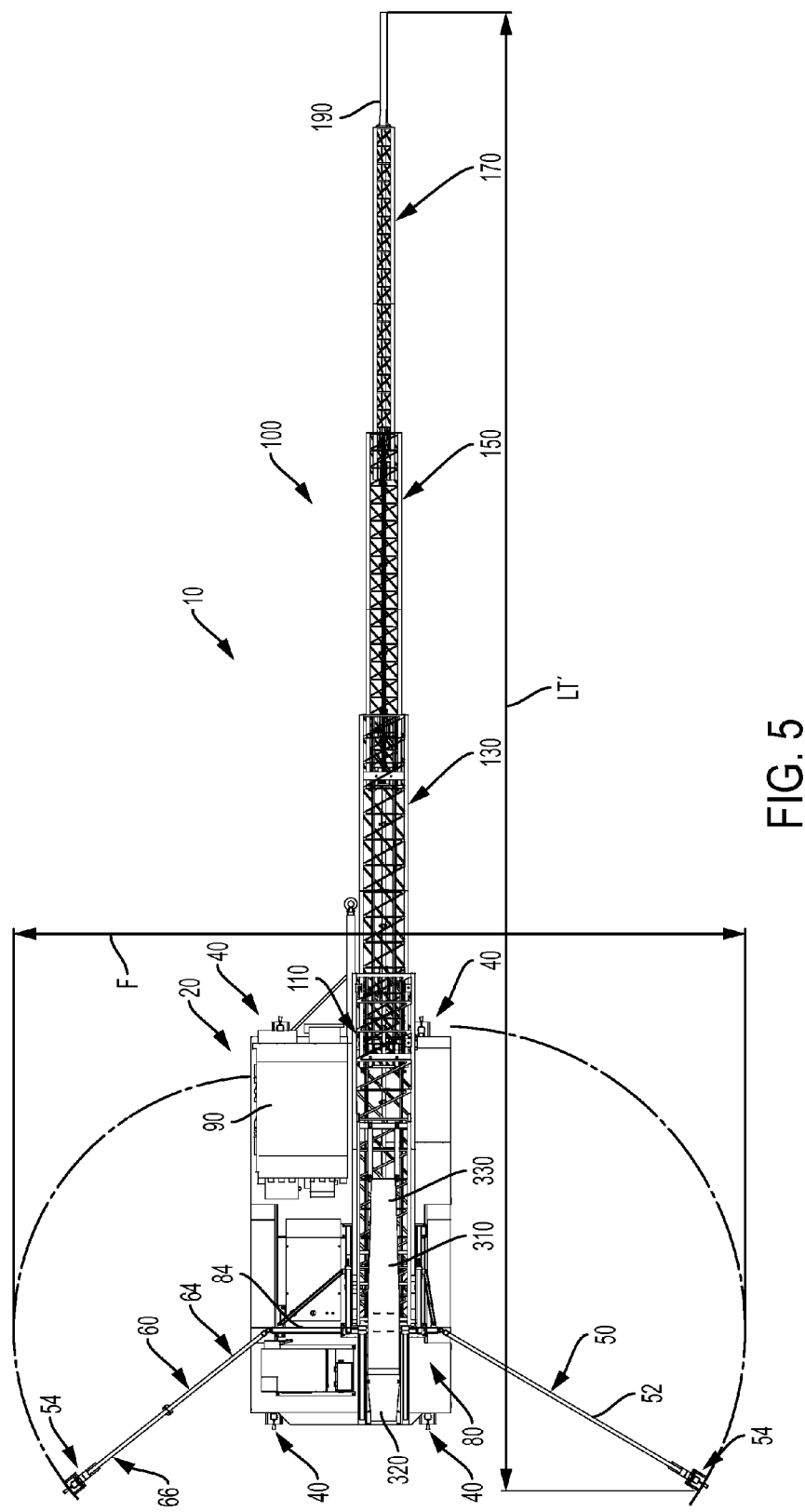
FIG. 5 is a top view of the communications unit of FIGS. 1 and 2 with the tower assembly thereof in a horizontally deployed orientation.

In the illustrated example, the platform 20 is additionally equipped with at least two outrigger assemblies 50, 60 to provide stability to the platform 20 and to form two or more paths for electricity to travel to ground. As can be seen in FIGS. 3 and 4, outrigger assembly 50 includes a first support truss assembly 52 that is pivotally mounted to a mounting frame assembly 80 that is attached to the platform frame 22. The mounting frame assembly 80 may be fabricated from steel tubing, I beams, angles, etc. and be attached to the platform frame 22 by welding, bolting and/or clamping. The components of the mounting frame 80, may be welded, bolted and/or clamped together in the configuration shown. As shown, the support truss assembly 52 is pivotally pinned to the mounting frame assembly 80 by pin connections 82 to facilitate selective pivotal travel between a transport position (FIGS. 1 and 2) and extended or deployed positions (FIGS. 3 and 5). In one embodiment, the outrigger assembly 50 includes an outrigger leg 54 that is selectively vertically extendable and retractable by a hand crank 56. Those outrigger assemblies manufactured by Ralph K. Bodmann Corporation of 1750 Costner Drive, Unit F, Warrington, Pa. 18976 may be employed, for example.

Still referring to FIGS. 3 and 4, the outrigger assembly 60 in the illustrated example includes a second support truss assembly 62 that comprises a primary truss segment 64 that is pivotally attached (e.g., pinned) to a secondary truss assembly 66. As can also be seen in FIG. 3, the primary truss assembly 64 is pivotally coupled (e.g., pinned) to two lateral support members 84 of the mounting frame assembly 80. An outrigger leg 54 and hand crank assembly 56 is attached to the secondary truss assembly 66 as shown. Such arrangement enables the outrigger assembly to "fold" into a transportation position (FIG. 2) and then be extended to the deployed position (FIGS. 3 and 5). In one exemplary arrangement, when both outrigger assemblies 50, 60 are deployed, they may provide the platform 20 with a deployed footprint width of over 32', for example (dimension "F" in FIG. 5).

The illustrated communications unit 10 includes one or more enclosures 90. Other embodiments, however, may not include any of such enclosures. The enclosure 90 may comprise any of the various shielding enclosure arrangements disclosed in any of the above-identified U.S. Patents that have been herein incorporated by reference in their respective entireties. As can be seen in FIG. 2, for example, another enclosure 97 is attached to a shell 91 of the enclosure 90. As described in further detail in U.S. Pat. No. 7,688,595, which has been herein incorporated by reference in its entirety, the enclosure 97 shares a common exterior wall portion with the shell 91. In alternative embodiments as also described in U.S. Pat. No. 7,688,595, other enclosures (not shown) may be provided inside of the enclosure 90 and also share a common exterior wall portion of the shell 91. Various enclosure module configurations may be employed. In other arrangements, other enclosures and equipment structures may be employed. To provide onsite power to the unit 10, one or more solar panels may be supported on the enclosure 90 or platform 20 or be mounted independent from the platform and enclosure, depending upon the application. In other applications, portable wind turbines, fuel cells or propane, gasoline or diesel fuel powered generators could also be employed if desired. In conventional applications, the unit 10 may be equipped to receive locally provided A/C or D/C power.

Figure 6:
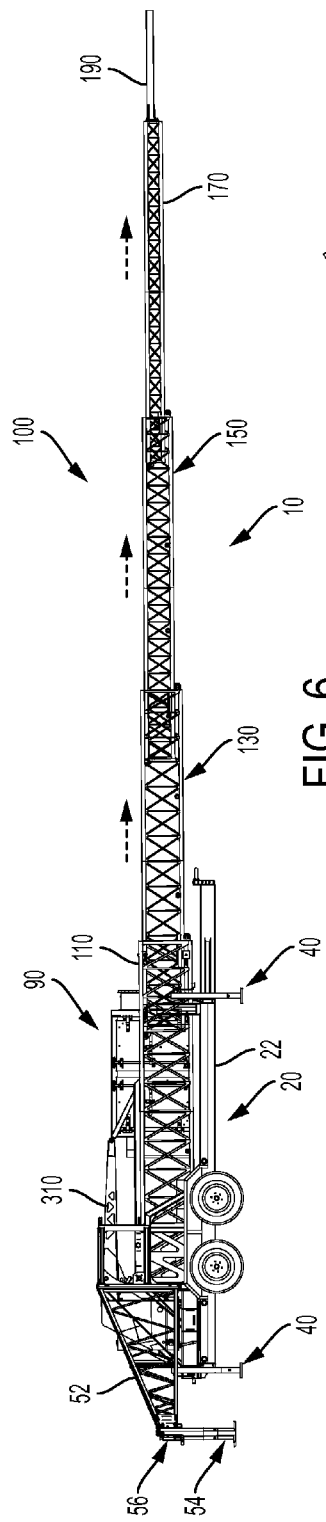
FIG. 6 is a side elevational view of the communications unit of FIG. 5.
Figure 7:
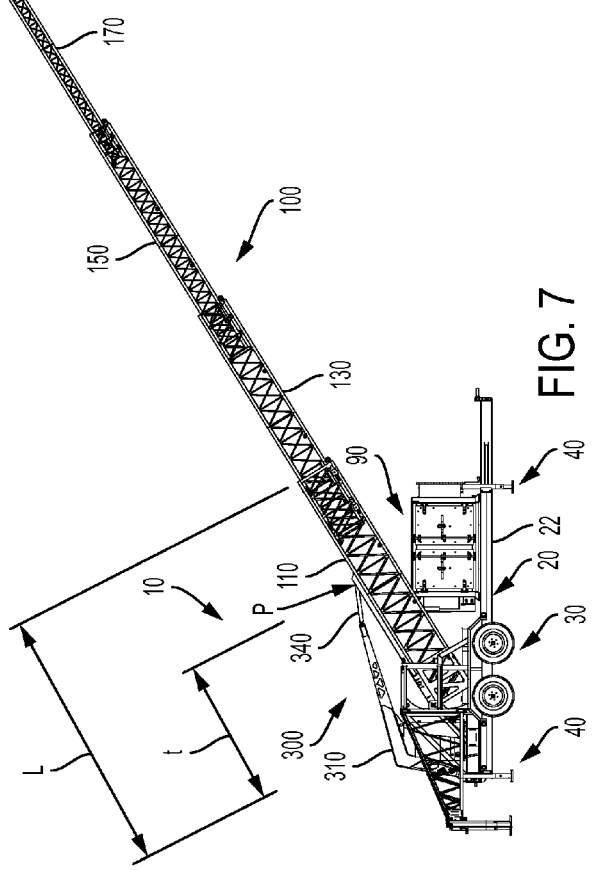
FIG. 7 is another side elevational view of the communications unit of FIGS. 1, 2, 5 and 6 with the tower assembly thereof being moved from the horizontally deployed orientation to the vertically deployed orientation.
Figure 8:
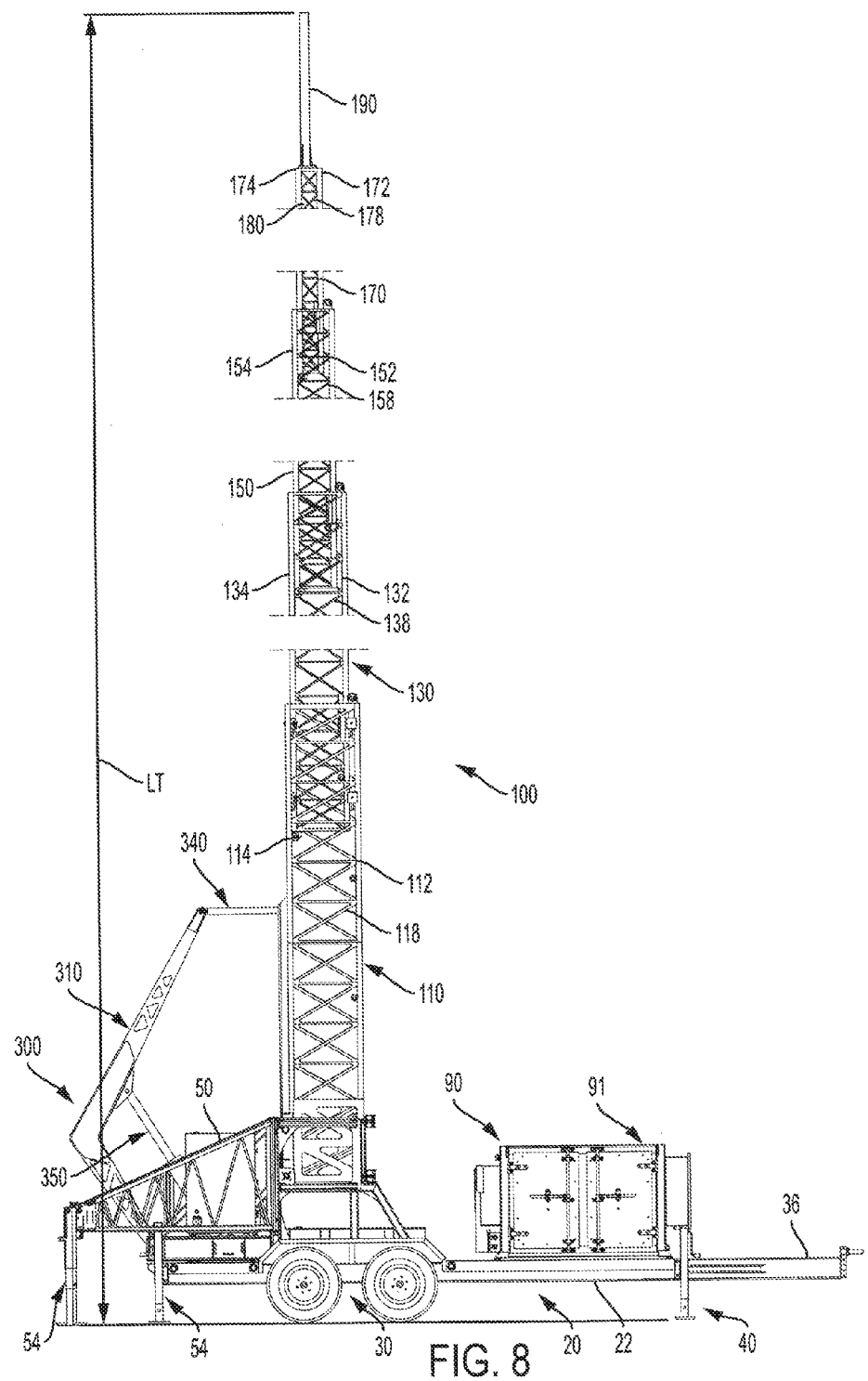
FIG. 8 is another side elevational view of the communications unit of FIGS. 1, 2, 5, 6 and 7 with the tower assembly thereof in the vertically deployed orientation.

The communications unit 10 further includes a selectively extendable and retractable tower assembly 100. As can be seen in FIGS. 1-8, in the illustrated example, the tower assembly 100 includes a plurality of "lattice-type" telescoping tower segments 110, 130, 150, 170. The tower assembly 100 may be provided with fewer tower segments or more than four tower segments depending upon the application, however. More particularly and with reference to FIGS. 4 and 9, the largest or "first" tower segment 110 includes three first columns 112, 114 and 116 that are interconnected by a collection of first struts 118. The first columns may be fabricated from, for example, 2" dom tube-50 ksi & steel plate (60 ksi) that is cut by a water jet machine to form the truss system. These plates are then welded to the legs to form the triangular tower segment. However, other materials and manufacturing methods may be employed without departing from the spirit and scope of the present invention. See FIGS. 9 and 11. For the purpose of explanation, column 112 will be referred to herein as a "first bottom" column and columns 114 and 116 will each be referred to as "first side" columns. Although the first tower segment 110 may have other shapes and configurations, it will become apparent that the triangular-shape and configuration forms a strong and relatively lightweight arrangement that may be particularly advantageous for remote installations. As can be seen in FIG. 4 and will be discussed in further detail below, the first tower segment 110 is pivotally attached to the mounting frame assembly 80 to facilitate its pivotal travel from a horizontal orientation (corresponding to a retracted "travel" position (FIGS. 1 and 2) and a horizontally deployed position (FIGS. 5 and 6) to a vertically deployed position (FIGS. 3, 4 and 8). The columns 112, 114, 116 of the first tower segment 110 define a first central tower space, generally designated as 120, into which the second tower segment 130 is telescopingly received.

The second tower segment 130 is similar in construction to the first tower segment 110 and includes three "second" columns 132, 134 and 136 that are interconnected by a collection of "second" struts 138. Column 132 will be referred to herein as a "second bottom" column and columns 134 and 136 will each be referred to as "second side" columns. The second columns 132, 134, 136 and the second struts 138 of the second tower segment 130 define a second central tower space, generally designated as 140, into which the third tower segment 150 is telescopingly received. See FIG. 11.

The third tower segment 150 is similar in construction to the first and second tower segments 110, 130 and includes three "third" columns 152, 154 and 156 that are interconnected by a collection of "third" struts 158. Column 152 will be referred to herein as a "third bottom" column and columns 154 and 156 will each be referred to as "third side" columns. The third columns 152, 154, 156 and the third struts 158 of the third tower segment 150 define a third central tower space, generally designated as 160, into which the fourth tower segment 170 is telescopingly received.

The fourth tower segment 170 is similar in construction to the first, second and third tower segments 110, 130, 150 and includes three "fourth" columns 172, 174 and 176 that are interconnected by a collection of "fourth" struts 178. Column 172 will be referred to herein as a "fourth bottom" column and columns 174 and 176 will each be referred to as "fourth side" columns. The fourth columns 172, 174, 176 and the fourth struts 178 of the fourth tower segment 170 define a fourth central tower space, generally designated as 180, into which an antenna 190 and/or other structure(s) and antennas may be telescopingly received.

Figure 9:
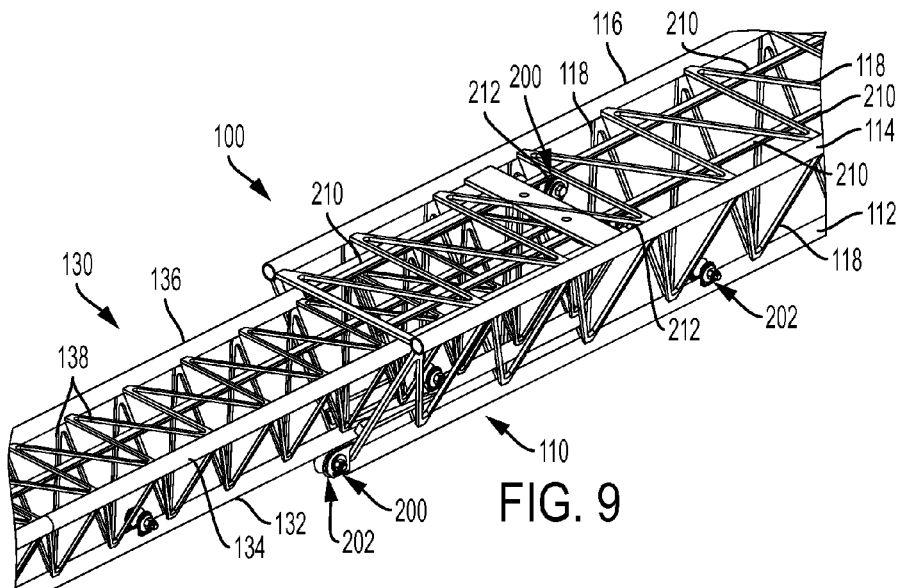
FIG. 9 is a perspective view of a portion of one form of tower assembly of the present invention.
Figure 10:
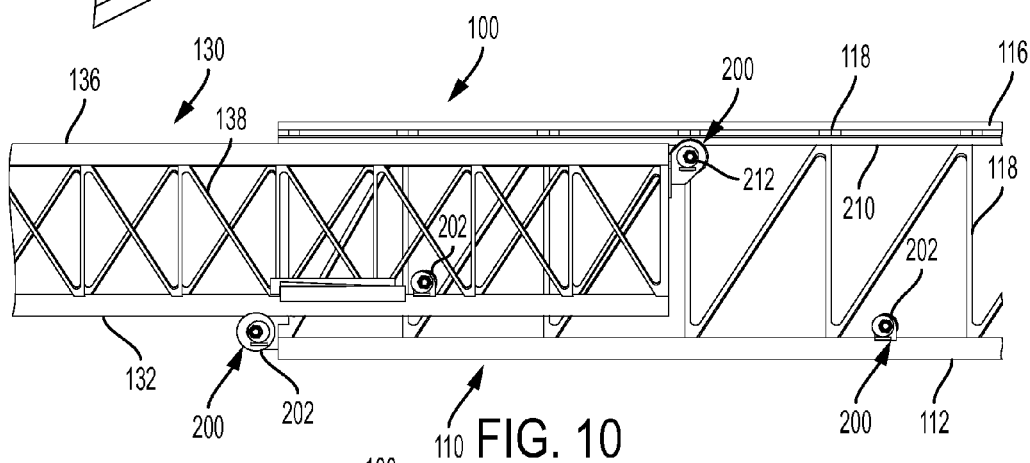
FIG. 10 is a side view of a portion of the tower assembly of FIG. 9.
Figure 11:
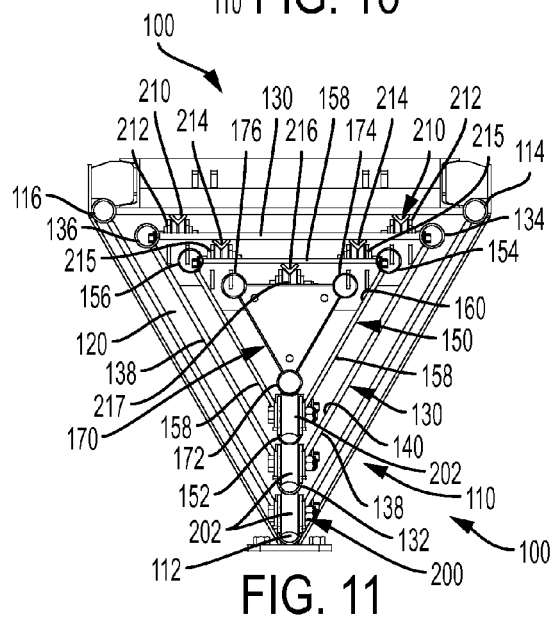
FIG. 11 is an end view of the tower assembly of FIGS. 9 and 10.
Figure 12:
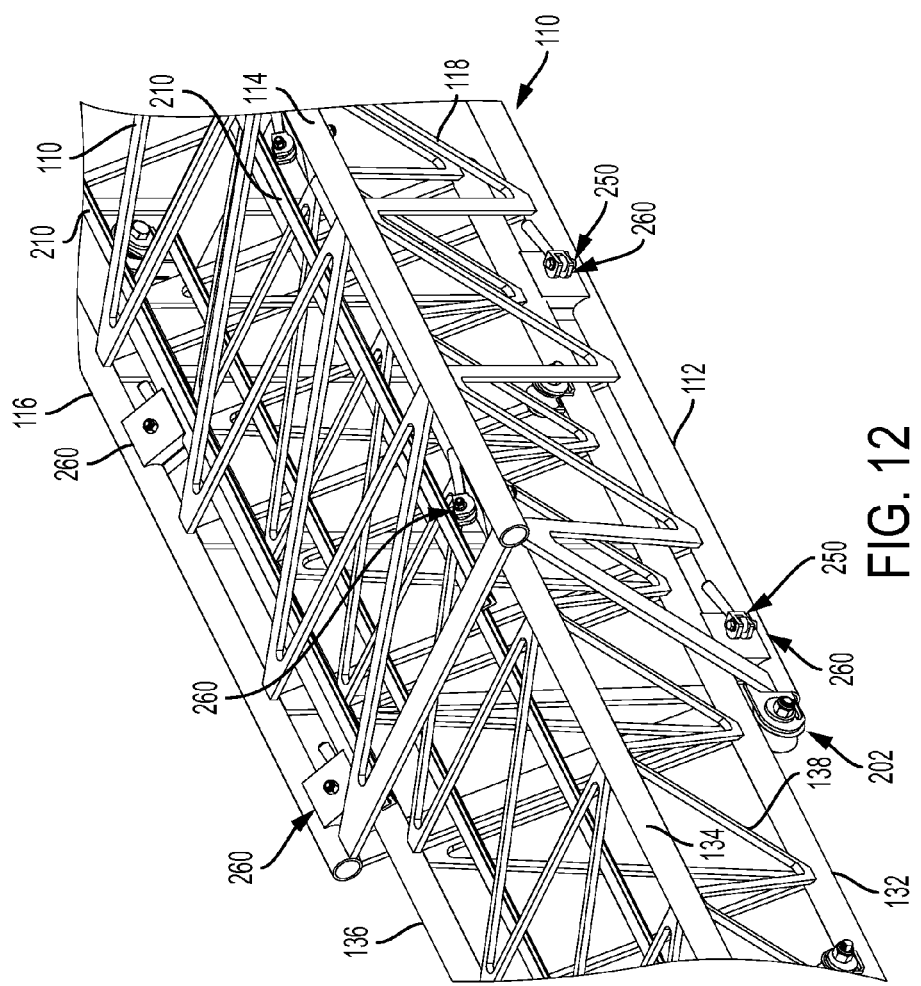
FIG. 12 is an enlarged perspective view of a portion of the tower assembly of FIGS. 9-11.

To facilitate manual deployment of the tower assembly 100 from the retracted travel position (FIGS. 1 and 2) to the horizontally deployed position (FIGS. 5 and 6), the illustrated tower assembly 100 employs means for movably supporting the tower segments relative to each other. In at least one form, for example, the means for movably supporting comprises a roller system 200 of the type illustrated in FIGS. 9-12. FIGS. 9 and 12, illustrate the first and second tower segments 110, 130. As can be seen in those Figures, the roller system 200 includes at least one and preferably a plurality of bottom roller bearings 202 that are attached to the bottom first column 112. The second bottom column 132 of the second tower segment 130 has a circular cross-sectional shape and the bottom roller bearings 202 are configured to rollably cradle the third bottom column 152 thereon. Likewise, the third bottom column 152 includes bottom roller bearings 202 thereon that are configured to rollably cradle the fourth bottom column 172 thereon.

Also in the illustrated embodiment, the illustrated roller system 200 further includes at least one and preferably two tracks 210 that are attached to the first struts 118 that extend between the two first side columns 114, 116 as shown in FIGS. 9 and 12. The tracks 210 may comprise, for example, elongated pieces of angle iron that is tack welded or otherwise attached to the first struts 118. The tracks 210 therefore have a V-shaped cross-sectional profile that is configured to rollably engage at least one and preferably a plurality of V-track rollers 212 that are mounted to the second tower segment 130 as shown in FIGS. 9-12. Similarly, as can be seen in FIG. 11, second tracks 214 are attached to the second struts 138. Third rollers 215 are attached to the third tower segment 150 and are configured to rollably engage the second tracks 214. A third track 216 is attached to the struts 158. At least one fourth roller 217 is attached to the fourth tower segment 170 and is configured to rollably engage the third track 216. See FIG. 11. This form of roller system may be employed to telescopingly mount the second tower segment 130 within the first central tower space 120 of the first tower segment 110 as well as the third tower segment 150 within the second central tower space 140 as well as the fourth tower segment 170 within the third central tower space 160. Such roller system arrangement enables the tower segments 110, 130, 150, 170 to be manually deployed between the retracted position (FIGS. 1 and 2) to the horizontally deployed position (FIGS. 5 and 6). As used in this context, the term "manually deployed" means that the tower segments may be telescopingly moved relative to each other by hand without the assistance of mechanical or electrically powered assistance, systems and/or tools. This feature offers a distinct advantage over prior tower arrangements that require cumbersome and power robbing hydraulic or electrically powered cylinders and/or cable systems to extend the tower segments to a fully extended position. However, other embodiments of the present invention may employ systems for telescoping the tower segments relative to each other while the tower assembly remains in its horizontal orientation. These variations are also intended to be within the scope of the present invention. Furthermore, because the tower segments of various embodiments of the present invention may be extended to their fully extended position while remaining in their horizontal positions (prior to extending the tower assembly vertically) regardless of whether they have been extended manually or by some form of powered system, many of the aforementioned problems associated with prior telescoping mast assemblies that must be extended while in their vertical orientations are avoided.

In the illustrated example, the tower assembly 100 includes four telescopingly arranged tower segments 110, 130, 150, 170. Depending upon the application, more or less tower segments may be employed. As shown in the Figures, a conventional antenna 190 is attached to the fourth tower segment 170. The antenna or antennas may be capable of telescoping within the fourth and/or third tower segments or the antenna(s) may not. As will be discussed in further detail below, various forms and numbers of antennas may be attached anywhere along the extended tower assembly while it is in its horizontally extended orientation. The reader will therefore appreciate that the tower assembly embodiments of the subject invention may be successfully employed in connection with a variety of different types and numbers of antennas without departing from the spirit and scope of the present invention. In one arrangement, the over all length of the tower assembly 100 when fully deployed (designated as "LT" in FIG. 8) may be approximately 60'. In addition, the overall length of the foot print required to accommodate that arrangement (designated as "LT" in FIG. 5 is approximately 60'-11", for example. Of course these lengths may vary.

Figure 13:
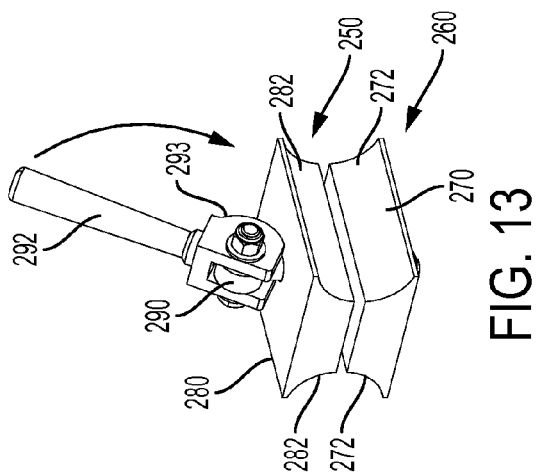
FIG. 13 is a perspective view of one form of lock member of the present invention in an unlocked orientation.
Figure 14:
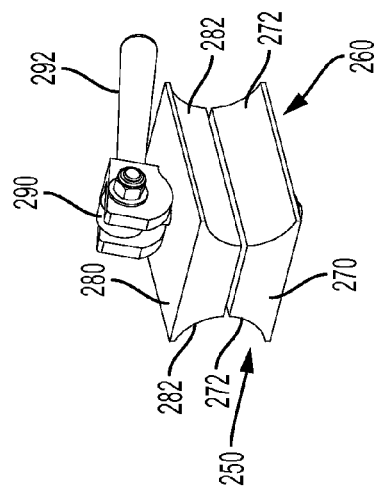
FIG. 14 is another perspective view of the lock member of FIG. 13 in a locked orientation.

The portable communications unit 10 further includes a locking assembly, generally designated as 250 that is configured to lock the tower segments in telescoping position relative to each other regardless of whether the tower assembly 100 is in the retracted position or in various stages of horizontal deployment. Referring now to FIGS. 12-14, the locking assembly 250 comprises a collection of lock members 260 that are configured to immovably and individually lock the respective tower segments together as will be further discussed below. FIGS. 13 and 14 Illustrate an exemplary lock member 260 that includes a first clamp base 270 and a second clamp base 280 that are movably journaled on a lock rod 290 to which a locking cam handle 292 is pivotally attached. The first and second clamp bases 270, 280 are loosely journaled on the lock rod 290 to enable the first and second clamp bases 270, 280 to move toward and away from each other in response to actuation of the locking cam handle 292. A spring (not shown) may be journaled on the lock rod 290 to bias the first and second clamp bases 270, 280 away from each other. The locking cam handle 292 includes a cam portion 293 that is supported for moveable engagement with the second clamp base 280.

As can be further seen in those Figures, the first clamp base 270 has opposed first retaining contours 272 formed therein and the second clamp base 280 has opposed second retaining contours 282 formed therein. The first and second retaining contours correspond to the outer contours of the corresponding tower columns such that when the locking cam handle is in the unlocked position (FIG. 13), the corresponding column is permitted to freely slide between the retaining contours 272, 282 and when the locking cam handle 190 is moved to the locked position (FIG. 14), the corresponding portion of the column is immovably retained between the locking contours 272, 282.

In the illustrated embodiment, for example, at least one and preferably a plurality of lock members 260 are employed to individually lock, for example, the second bottom column 132 to the first bottom column 112, the second side column 134 to the first side column 114, and the second side column 136 to the first side column 116. In addition, at least one and preferably a plurality of lock members 260 are employed to individually lock, for example, the third bottom column 152 to the second bottom column 132, the third side column 154 to the second side column 134, and the third side column 156 to the second side column 136. Also, at least one and preferably a plurality of lock members 260 are employed to individually lock, for example, the fourth bottom column 172 to the third bottom column 152, the fourth side column 174 to the third side column 154, and the fourth side column 176 to the third side column 156. Each lock member 260 may be easily manually moved between the locked and unlocked position without the use of tools or other mechanical assistance. The lock members 260 may be used to lock the tower assembly 100 in the retracted position (FIGS. 1 and 2) for transportation purposes, then unlocked after the communication unit 10 has been moved into position to enable the tower segments 130, 150, 170 to be respectively telescoped into the horizontally deployed position (FIGS. 5 and 6). Once the tower segments 130, 150, 170 have been moved to the horizontally deployed position, each of the lock members 260 may be actuated to lock the tower segments together in the above-described manner. By locking each column of one tower segment to the corresponding columns of the next immediate tower segment telescopingly supported therein results in a very rigid tower structure. Those of ordinary skill in the art will also understand that other types of locking mechanisms and arrangements may be successfully employed to lock the tower segments in their extended and retracted positions without departing from the spirit and scope of the present invention. For example, other locking mechanism and arrangements may be employed to accommodate larger tubing and/or structural components as well as larger tower segments.

Once the tower assembly 100 has been moved to its horizontally deployed position (FIGS. 5 and 6), a deployment assembly 300 may be employed to move the tower assembly 100 to a vertically deployed position (FIGS. 3, 4 and 8). In the illustrated example, the deployment assembly 300 comprises a deployment arm 310 that includes a first leg portion 320 and a second leg portion 330 that protrudes from the first leg portion at an obtuse angle (angle "G" in FIG. 15). In one embodiment, angle "G" is approximately 120°, for example. The deployment arm 310 may be fabricated from formed and welded carbon steel, for example. In one form, for example, the deployment arm is approximately 10'-4" long (dimension "M" in FIG. 15) with an overall height "N" of approximately 4'-2" as shown in FIG. 16. Distance "O" in FIG. 15 is approximately 3'-7½" and distance "W" in FIG. 16 is approximately 1'4". These dimensions are exemplary in nature and not intended to be limiting. In the illustrated arrangement, a pair of opposed mounting pins 322 are mounted to the first leg portion 320 that are adapted to be rotatably mounted within spherical bearings 324 mounted to the mounting frame assembly 80. See FIGS. 3 and 4. Such arrangement facilitates pivotal attachment of the deployment arm 310 to the mounting frame assembly 80. The second leg portion 330 is pivotally attached to a tension arm 340. The tension arm 340 is pivotally attached to the first tower segment 110. The tension arm 340 is configured to telescope to maintain constant tension between the deployment arm 310 and the first tower segment 110. The deployment arm 310 is pivoted between a un-deployed position (FIGS. 1, 2, 5 and 6) and deployed positions (FIGS. 3, 4, 7 and 8) by a conventional hydraulic cylinder arrangement 350. Those hydraulic cylinders manufactured by Prince Manufacturing of North Sioux City, S. Dak. may, for example, be employed. In one arrangement, for example, the cylinder has a 6" bore with a 30" stroke. Of course other forms of cylinders/arms may be successfully employed. When in the travel orientation, the deployment assembly 300 retains the tower assembly 100 and more particularly, the first tower segment 110 in its horizontal orientation. In one arrangement for example, when the tower assembly 100 is retained in its horizontal travel orientation, the overall height "H" of the unit 10 may be approximately 6'-5½" which may enable the unit to be towed or otherwise moved into many conventional parking garages. See FIG. 1.

Use of the deployment/tension arm arrangement of the present invention represents a vast improvement over other mast arrangements that employ hydraulic cylinder(s) to pivot the bottom segment of the mast from a horizontal position to a vertical position. For example, in many prior arrangements, the cylinder housing is attached to the unit base and the end of the extendable cylinder or piston is attached to the first mast segment. The point at which the end of the extendable piston is attached to the first mast segment is located relatively close to the bottom of the first mast segment. This can result in a relatively unstable mast assembly as well as create large amounts of stress at the point of attachment when the tower assembly is extended to its fully extended vertical position. Such condition often requires that guy wires be used to support the extended assembly. Use of the deployment/tension arm arrangement, however, enables a smaller hydraulic cylinder to be used while providing a stable means for supporting the tower assembly in a vertical orientation. As can be seen in FIG. 7, for example, the point at which the tension arm 340 is attached to the first tower segment (represented as "P") is located a distance "X" that is at least as long (and preferably longer) than one half of the length "L" of the first tower segment. For example, in one arrangement, the distance "X" is approximately 8.75 feet and "L" is approximately 15 feet. See FIG. 7. By moving the point of attachment further down the first tower segment may make the entire assembly more stable and supportable in the vertical orientation by the deployment arm without the use of guy wires, for example.

Use of the portable communications unit 10 will now be explained. The unit 10 may be driven to or otherwise moved to its final destination while the tower assembly 100 is in its retracted travel position (FIGS. 1 and 2). Once the platform 20 has been moved into its desired location, the two front leg assemblies 40 and the two outrigger assemblies 50, 60 may be deployed in the above described manners to lift the wheel assembly 30 off the ground and to level the platform 20. See FIGS. 5 and 6. Once the platform 20 has been leveled on the leg assemblies 40 and outriggers 50, 60, the tower assembly 100 may be moved to its horizontally deployed orientation (FIGS. 5 and 6). To move the tower assembly 100 to its horizontally deployed position, the user unlocks the corresponding lock members 260 to permit the second tower segment 130 to telescope out of the first tower segment 110, the third tower segment 150 to telescope out of the second tower segment 130, and the fourth tower segment 170 to telescope out of the third tower segment 150 as shown in FIGS. 5 and 6. After each tower segment has been moved to its telescoped position, it is once again locked in position using the lock members 260 in the above described manner. In at least one arrangement, the tower segments may be manually moved into their horizontally deployed position by one or more users without the use of separate or additional deployment equipment or tools. After the tower assembly 10 has been moved into its horizontally deployed position and each tower segment has been locked into the adjacent tower segments in the above-described manner, the hydraulic cylinder arrangement 350 may be extended to actuate the deployment arm 310 to extend the tower assembly 100 to its vertically deployed position (FIGS. 4 and 8).

The deployment arm 310 retains the tower assembly 100 in that vertically deployed position until the user desires to return the tower assembly to the horizontally deployed position. For example, if it is desired to move the unit to another location, the hydraulic cylinder arrangement 350 is actuated to move the tower assembly 100 to the horizontally deployed position. Thereafter, the locking assemblies 250 are unlocked to permit the tower segments to be moved to the retracted travel orientation. Once each tower segment is moved into the retracted travel position, the locking assemblies are relocked to retain the tower segments in that position for travel purposes.

A variety of different types of conventional antennas may be attached to the fourth tower segment 170 (or anywhere along the extended tower assembly) by conventional means (clamping, bolting, etc.). Appropriate antenna cables or conductors (not shown) may be attached to the antenna 190 (or multiple antennas) and be attached to the tower segments by, for example, clamps or other connectors (not shown)

such as those manufactured by Times Microwave under product numbers LMR 400, LMR, 500, LMR 600, LMR 900 and LMR1200. However, other methods of attaching the antenna conductor(s) may be employed. The attachment of the antenna(s) and/or other components may be done while the tower assembly is in its horizontally extended orientation. Thus, in at least some embodiments, the user may attach the antenna(s) and components while standing beside the unit and without the use of ladders and the like. In addition, the user may attach the antenna conductors/cables that extend from the antenna(s) and other components to the tower assembly at several points along the tower assembly while the tower assembly is in the horizontal orientation. This prevents the cables from swing in the wind after the tower assembly has been moved to its vertical orientation. In various arrangements, for example, the other end(s) of the antenna conductors/cables 95 may extend through wall or walls of the enclosure 90 through shielded cable entry ports 93 of the types described in, for example, U.S. Pat. No. 7,688,595, which has been herein incorporated by reference to operably interface with the equipment therein. Lightning striking the antenna 190 and/or the tower 100 will travel down the tower, into the platform frame 22, and pass through one or more of the legs 40 and or extended outriggers 50, 60 to the ground. Any electricity from the lightning strike traveling on the antenna conductor will be transported onto the shell 91 of the enclosure 90 through the ground conducting capability of the cable entry port of the types disclosed in U.S. Pat. No. 7,688,595 and/or the other various U.S. Patents which have been herein incorporated by reference in their respective entireties.

Accordingly, the present invention provides solutions to the aforementioned problems and others associated with protecting electrical components from damage caused by lightning strikes or externally generated magnetic fields resulting from adjacent equipment or sabotage. In various arrangements, the present invention also provides a means for protecting a plurality of electrical components located at a remote site from lightning damage, corrosion, insect and vermin damage, etc. The present invention also provides a compact selectively extendable tower assembly that can withstand, for example, relatively high winds (in some cases wind speeds in excess of 75 mph for example) and can support relatively high antenna payloads (in some cases in excess of 400 pounds for example). The mobile platform may be easily transported on the highway and even, in some arrangements, be capable of being driven and parked in conventional parking garages if desired. It will be understood, however, that various changes in the details, materials and arrangements of parts which have been herein described and illustrated in order to explain the nature of the invention may be made by those skilled in the art within the principle and scope of the invention as expressed in the claims appended hereto or hereafter added.

As discussed in detail above, the various tower segments may be extended to their respective fully extended positions while they are in their horizontal orientation. In various embodiments, each tower segment may be easily accessed from the ground without the need for a ladder or other lifting arrangement. In certain arrangements, the tower segments may be easily manually extended without the use of tools or other bulky, power robbing equipment such as cable systems and/or cylinder arrangements, for example. In at least some arrangements, once the tower segments are moved into their fully extended positions, they may be locked in those positions without the use of tools. While the tower assembly is in the fully extended horizontal position, the entire tower assembly is easily accessible from the ground. Such arrangement makes it easy for the user to install one or more antennas or other components anywhere along the entire tower assembly. Once the antenna(s) and/or other components have been installed, the user may attach their respective cables along the entire length of the tower assembly to prevent the cables from whipping in the wind or otherwise moving which might result in damage to the cable as well as to the antenna or other component to which it is attached. Such attachment of the cable(s) may be accomplished from the ground without the use of ladders or other lifting arrangements. These advantages over prior telescoping mast systems enable the present tower assembly to be easily and safely deployed without the use of power robbing systems, and/or ladders and facilitate the easy installation access and repair of antennas and other components at multiple locations along the mast.

The various deployment assembly arrangements of the present invention enable the horizontally-deployed tower assembly to be moved into its vertically oriented position and retained in that position without the need for guy wires. The deployment/tension arm arrangement affords stability to the tower assembly, while enabling use of a conventional hydraulic cylinder to pivot the deployment arm. This is a vast improvement over prior arrangements that just employ a hydraulic cylinder to pivot the first tower segment.

Although the various embodiments of the units, systems and methods have been described herein in connection with certain disclosed embodiments, many modifications and variations to those embodiments may be implemented. Also, where materials are disclosed for certain components, other materials may be used. Furthermore, according to various embodiments, a single component may be replaced by multiple components, and multiple components may be replaced by a single component, to perform a given function or functions. The foregoing description and following claims are intended to cover all such modification and variations.

With respect to the use of substantially any plural and/or singular terms herein, those having skill in the art can translate from the plural to the singular and/or from the singular to the plural as is appropriate to the context and/or application.

Example 1

A communications unit that, in at least one form, comprises a platform and a tower assembly that is operably coupled to the platform. The tower assembly is movable between a horizontally deployed position and a vertically deployed position relative to the platform. The tower assembly comprises a plurality of telescoping tower segments that are movably supported relative to each other such that the plurality of telescoping tower segments may be selectively manually deployed from a retracted position to the horizontally deployed position. A locking assembly is configured to selectively and individually lock each of the plurality of telescoping tower segments in the horizontally deployed position. A deployment assembly operably interfaces with the tower assembly and is configured to selectively move the tower assembly between the horizontally deployed position and the vertically deployed position and retain the tower assembly in the vertically deployed position.

Example 2

A communications unit that in at least one form comprises a platform and a tower assembly that is operably coupled to the platform. The tower assembly is movable between a horizontally deployed position to a vertically deployed position relative to the platform. The tower assembly comprises a plurality of telescoping tower segments that are movably supported relative to each other such that the plurality of telescoping tower segments may be selectively manually deployed from a retracted position to the horizontally deployed position. The communications unit further comprises means for selectively and individually locking each of the plurality of telescoping tower segments in the horizontally deployed position and means for selectively moving the tower assembly between the horizontally deployed position and the vertically deployed position and retaining the tower assembly in the vertically deployed position.

Example 3

A portable communications unit that in at least one form comprises an electrically groundable portable platform. A tower assembly is operably coupled to the portable platform and is movable between a horizontally deployed position to a vertically deployed position relative to the portable platform. The tower assembly comprises at least four concentric tower segments that are movably supported in a telescoping orientation relative to each for selective movement between a retracted position and the horizontally deployed position and wherein a largest one of the tower segments is supported for movement relative to the portable platform between the horizontally deployed position and the vertically deployed position. A plurality of manually actuatable lock assemblies are provided for locking the tower assembly in the horizontally deployed position. The communications unit further comprises a deployment arm that comprises a first leg portion that is pivotally coupled to the portable platform and a second leg portion that projects from the first leg portion at an obtuse angle relative thereto. The second leg portion operably interfaces with the largest one of the tower segments and is movable between an unactuated position wherein the largest one of the tower segment is retained in at least one of the retracted position and the horizontally deployed position and an actuated position wherein the deployment arm moves the tower assembly from the horizontally deployed position to the vertically deployed position. The unit further comprises a hydraulically actuatable cylinder for moving the deployment arm between the actuated and unactuated positions. A shell is supported on the portable platform and is electrically grounded thereto. The shell has a plurality of exterior wall portions fabricated from electrically conductive material. The unit further comprises an enclosure that has a common exterior wall portion with the shell and is attached thereto. The common exterior wall portion is lined with a magnetic shield material. At least one power supply cable enters the enclosure through the common exterior wall portion and the magnetic shield material.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. A communications unit, comprising:
   a platform; and
   a tower assembly operably coupled to said platform and being movable between a horizontally deployed position and a vertically deployed position relative to said platform, said tower assembly comprising:
   a plurality of telescoping tower segments movably supported relative to each other such that said plurality of telescoping tower segments may be selectively manually deployed from a retracted position to said horizontally deployed position, said plurality of telescoping tower segments comprising:
      a first tower segment movably coupled to said platform;
      a second tower segment telescopingly coupled to said first tower segment and being selectively manually movable relative to said first tower segment between a first fully retracted position and a first fully extended position;
      a third tower segment telescopingly coupled to said second tower segment and being selectively manually movable relative to said second tower segment between a second fully retracted position and a second fully extended position, said third tower segment being individually telescopingly movable relative to said second tower segment to any second telescoping position between said second fully retracted position and said second fully extended position without telescopingly extending said second tower segment relative to said first tower segment;
      a locking assembly configured to selectively and individually lock said second tower segment in said first fully retracted position and said first fully extended position and any first telescoping position therebetween and said third tower segment in said second fully retracted position and said second fully extended position and said any second telescoping position therebetween; and
   wherein said communications unit further comprises:
   a deployment assembly operably interfacing with said tower assembly and being configured to selectively move the tower assembly between said horizontally deployed position and said vertically deployed position and retain said tower assembly in said vertically deployed position.

2. The communications unit of claim 1 wherein said first tower segment is pivotally coupled to said platform and defines a first central tower space therewithin and wherein said second tower segment defines a second central tower space therewithin and is telescopingly received within said first central tower space and wherein said third tower segment is telescopingly received within said second central tower space.

3. The communications unit of claim 2 wherein said first tower segment, said second tower segment and said third tower segment are each triangular shaped when viewed from their respective ends.

4. The communications unit of claim 3 wherein said first tower segment comprises a first tower frame assembly comprising three first columns that are interconnected together by a collection of first struts and wherein said second tower segment comprises a second tower frame assembly comprising three second columns that are interconnected together by a collection of second struts and wherein said third tower segment comprises a third tower frame assembly comprising three third columns that interconnected together by a collection of third struts.

5. The communications unit of claim 4 wherein a bottom one of said second columns is movably supported on a corresponding bottom one of said first columns by at least one first roller assembly and wherein a bottom one of said third columns is movably supported on said bottom one of said second columns by at least one second roller assembly.

6. The communications unit of claim 5 further comprising:
   a first roller track system for telescopingly supporting said second tower segment within said first central tower space within said first tower segment; and
   a second roller track system for telescopingly supporting said third tower segment within said second central tower space within said second tower segment.

7. The communications unit of claim 6 wherein said first roller track system comprises:
   at least one elongate first track coupled to one of said first and second tower frame assemblies; and
   at least one first track roller attached to the other one of said first and second tower frame and corresponding to each of said at least one elongate first track to rollably interact therewith and wherein said second roller track system comprises:
   at least one elongate second track coupled to one of said second and third tower frame assemblies; and
   at least one second track roller attached to the other one of said second and third tower frame assemblies and corresponding to each of said at least one elongate second track to rollably interact therewith.

8. The communications unit of claim 2 wherein said deployment assembly comprises:
   a deployment arm comprising a first leg portion pivotally coupled to said platform and a second leg portion projecting from said first leg portion at an obtuse angle relative thereto, said second leg portion operably interfacing with said first tower segment, said deployment arm movable between an unactuated position wherein said first tower segment is retained in at least one of said retracted position and said horizontally deployed position and an actuated position wherein said deployment arm moves said tower assembly from said horizontally deployed position to said vertically deployed position;
   and
   means for moving the deployment arm between said actuated and unactuated positions.

9. The communications unit of claim 2 wherein said third tower segment defines a third central tower space therewithin and wherein said plurality of telescoping tower segments further comprises a fourth tower segment telescopingly received within said third central tower space.

10. The communications unit of claim 1 wherein said first tower segment comprises at least three first columns that are interconnected together to define a first central tower segment area therebetween and wherein said second tower segment is telescopingly received within said first central tower segment area and comprises at least three second columns that are interconnected together to define a second central tower segment area therebetween and wherein said third tower segment is telescopingly received within said second central tower segment area and comprises at least three third columns that are interconnected together and wherein said locking assembly comprises:
   at least one first lock member positioned between at least one of said first columns and a corresponding one of said second columns adjacent thereto, each said at least one first lock member movable between a first unlocked position wherein said second tower segment is movable within said first central tower segment area and a first locked position wherein said at least one of said first columns and said corresponding one of said second columns are immovably locked together; and
   at least one second lock member positioned between at least one of said second columns and a corresponding one of said third columns adjacent thereto, each said at least one second lock member being movable between a second unlocked position wherein said third tower segment is movable within said second central tower segment area and a second locked position wherein said at least one of said second columns and said corresponding one of said third columns are immovably locked together.

11. The communications unit of claim 10 wherein at least one of said first lock members is cam-actuated.

12. The communications unit of claim 11 wherein said at least one of said first lock members comprises:
   first and second clamp bases supported for movable travel relative to each other between said unlocked position and said locked position wherein a portion of said at least one of said first columns and another portion of said corresponding one of said second columns are clamped between said first and second clamp bases; and
   a manually-actuatable cam operably interfacing with said first and second clamp bases to selectively move said first and second clamp bases between said unlocked position and said locked position and to selectively retain said first and second clamp bases in said locked position.

13. The communications unit of claim 12 wherein said first clamp base comprises opposed first retaining contours formed thereon wherein one of said opposed first retaining contours corresponds to an outer contour of said portion of said at least one of said first columns and wherein another of said opposed first retaining contours corresponds to another outer contour of said another portion of said corresponding one of said second columns and wherein said second clamp base comprises opposed second retaining contours formed thereon wherein one of said opposed second retaining contours corresponds to said outer contour of said portion of said at least one of said first columns and wherein another of said opposed second retaining contours corresponds to said another outer contour of said another portion of said corresponding one of said second columns.

14. The communications unit of claim 1 wherein said platform is electrically groundable and wherein said communications unit further comprises:
- a shell supported on said platform and being electrically grounded thereto, said shell having a plurality of exterior wall portions fabricated from electrically conductive material;
- an enclosure having a common exterior wall portion with said shell and being attached thereto, said common exterior wall portion being lined with a magnetic shield material; and
- at least one power supply cable entering said enclosure through said common exterior wall portion and said magnetic shield material.

15. The communications unit of claim 1 comprising a fourth tower segment telescopingly coupled to said third tower segment and being selectively manually movable relative to said third tower segment between a third fully retracted position and a third extended position, said fourth tower segment being individually telescopingly movable relative to said third tower segment without telescopingly extending said second tower segment relative to said first tower segment and said third tower segment relative to said second tower segment.

16. A method of installing a communications unit in a remote location, comprising:
- moving a communications unit of claim 1 to the remote location while the plurality of telescoping tower segments are retained in a stored position wherein said second tower segment is in said first fully retracted position and said third tower segment is in said second fully retracted position;
- moving the plurality of telescoping tower segments from the stored position to the horizontally deployed position;
- locking the plurality of telescoping tower segments together to retain the tower assembly in the horizontally deployed position; and
- actuating the deployment assembly to move the locked tower assembly to the vertically deployed position.

17. A portable communications unit, comprising:
an electrically groundable portable platform; and
a tower assembly operably coupled to said portable platform and being movable between a horizontally deployed position to a vertically deployed position relative to said portable platform, said tower assembly comprising:
- at least four concentric tower segments movably supported in a telescoping orientation relative to each other for selective movement between a retracted position and said horizontally deployed position and wherein a largest one of said tower segments is supported for movement relative to said portable platform between said horizontally deployed position and said vertically deployed position;
- a plurality of manually actuatable lock assemblies for locking said tower assembly in said horizontally deployed position;
- a deployment arm comprising a first leg portion pivotally coupled to said portable platform and a second leg portion projecting from said first leg portion at an obtuse angle relative thereto, said second leg portion operably interfacing with said largest one of said tower segments, said deployment arm movable between an unactuated position wherein said largest one of said tower segment is retained in at least one of said retracted position and said horizontally deployed position and an actuated position wherein said deployment arm moves said tower assembly from said horizontally deployed position to said vertically deployed position;
- a hydraulically actuatable cylinder for moving the deployment arm between said actuated and unactuated positions and wherein said portable communications unit further comprises:
a shell supported on said portable platform and being electrically grounded thereto, said shell having a plurality of exterior wall portions fabricated from electrically conductive material;
an enclosure having a common exterior wall portion with said shell and being attached thereto, said common exterior wall portion being lined with a magnetic shield material; and
at least one power supply cable entering said enclosure through said common exterior wall portion and said magnetic shield material.

18. The portable communications unit of claim 17 wherein said largest of said tower segments defines a first central tower space and wherein said at least four telescoping tower segments further comprises:
- a second tower segment movably supported within said first central tower space on a plurality of first rollers, said second tower segment defining a second central tower space;
- a third tower segment movably supported within said second central tower space on a plurality of second rollers, said third tower segment defining a third central tower space; and
- a fourth tower segment movably supported within said third central tower space on a plurality of third rollers.

19. The portable communications unit of claim 18 wherein said largest tower segment, said second tower segment, said third tower segment and said fourth tower segment each at least comprise a first column, a second column and a third column and wherein said portable communications unit further comprises:
- first means for selectively locking said first, second and third columns of said largest tower segment to said first, second and third columns, respectively of said second tower segment;
- second means for selectively locking said first, second and third columns of said second tower segment to said first, second and third columns, respectively of said third tower segment; and
- third means for selectively locking said first, second and third columns of said third tower segment to said first, second and third columns, respectively of said fourth tower segment.

20. A communications unit, comprising:
a platform; and
a tower assembly operably coupled to said platform and being movable between a horizontally deployed position and a vertically deployed position relative to said platform, said tower assembly comprising:
a plurality of telescoping tower segments comprising:
- a first tower segment comprising at least three first columns that are interconnected together to define a first central tower segment area therebetween;
- a second tower segment telescopingly received within said first central tower segment area and comprising at least three second columns interconnected together to define a second central tower segment area therebetween;

a third tower segment telescopingly received within said second central tower segment area and comprising at least three third columns that are interconnected together; and a locking assembly comprising:
at least one first lock member positioned between at least one of said first columns and a corresponding one of said second columns adjacent thereto, each said at least one first lock member movable between a first unlocked position wherein said second tower segment is movable within said first central tower segment area and a first locked position wherein said at least one of said first columns and said corresponding one of said second columns are immovably locked together and wherein said at least one of said first lock members comprises:
first and second clamp bases supported for movable travel relative to each other between said unlocked position and said locked position wherein a portion of said at least one of said first columns and another portion of said corresponding one of said second columns are clamped between said first and second clamp bases; and
a manually-actuatable cam operably interfacing with said first and second clamp bases to selectively move said first and second clamp bases between said unlocked position and said locked position and to selectively retain said first and second clamp bases in said locked position, said locking assembly further comprising:
at least one second lock member positioned between at least one of said second columns and a corresponding one of said third columns adjacent thereto, each said at least one second lock member being movable between a second unlocked position wherein said third tower segment is movable within said second central tower segment area and a second locked position wherein said at least one of said second columns and said corresponding one of said third columns are immovably locked together and wherein said communications unit further comprises:
a deployment assembly operably interfacing with said tower assembly and being configured to selectively move the tower assembly between said horizontally deployed position and said vertically deployed position and retain said tower assembly in said vertically deployed position.

21. The communications unit of claim 20 wherein said first clamp base comprises opposed first retaining contours formed thereon wherein one of said opposed first retaining contours corresponds to an outer contour of said portion of said at least one of said first columns and wherein another of said opposed first retaining contours corresponds to another outer contour of said another portion of said corresponding one of said second columns and wherein said second clamp base comprises opposed second retaining contours formed thereon wherein one of said opposed second retaining contours corresponds to said outer contour of said portion of said at least one of said first columns and wherein another of said opposed second retaining contours corresponds to said another outer contour of said another portion of said corresponding one of said second columns.

22. A communications unit, comprising:
a platform; and
a tower assembly operably coupled to said platform and being movable between a horizontally deployed position and a vertically deployed position relative to said platform, said tower assembly comprising:
a first tower segment pivotally coupled to said platform and defining a first central tower space therewithin;
a second tower segment defining a second central tower space therewithin and being telescopingly received within said first central tower space; and
a third tower segment telescopingly received within said second central tower space, said second and third tower segments being movably supported relative to each other such that said second and third tower segments may be selectively manually deployed from a retracted position to said horizontally deployed position;
a locking assembly configured to selectively and individually lock each of said plurality of telescoping tower segments in said horizontally deployed position; and
a deployment assembly operably interfacing with said tower assembly and being configured to selectively move the tower assembly between said horizontally deployed position and said vertically deployed position and retain said tower assembly in said vertically deployed position said deployment assembly comprising a deployment arm that comprises a first leg portion that is pivotally coupled to said platform and a second leg portion projecting from said first leg portion at an obtuse angle relative thereto, said second leg portion operably interfacing with said first tower segment, said deployment arm movable between an unactuated position wherein said first tower segment is retained in at least one of said retracted position and said horizontally deployed position and an actuated position wherein said deployment arm moves said tower assembly from said horizontally deployed position to said vertically deployed position; and
means for moving the deployment arm between said actuated and unactuated positions.

23. A method of installing a tower unit in a remote location, comprising:
providing a tower unit comprising:
a platform; and
a tower assembly operably coupled to said platform and being movable between a horizontally deployed position and a vertically deployed position relative to said platform, said tower assembly comprising:
a plurality of telescoping tower segments each being movably supported relative to each other and configured to be selectively manually movable between a corresponding fully retracted position and a corresponding fully deployed position while said tower assembly is in said horizontally deployed position;
at least one locking clamp associated with each of said plurality of telescoping tower segments for selectively clamping said telescoping tower segment in any position between and including said corresponding fully retracted and said corresponding fully deployed position; and
a deployment assembly operably interfacing with said tower assembly and being configured to selectively move the tower assembly between said horizontally deployed position and said vertically deployed position and retain said tower assembly in said vertically deployed position and wherein said method further comprises:

moving said tower unit to the remote location while the plurality of telescoping tower segments are retained in said fully retracted position;

moving the plurality of telescoping tower segments from the fully retracted position to the horizontally deployed position;

locking the plurality of telescoping tower segments together to retain the tower assembly in the horizontally deployed position; and actuating the deployment assembly to move the locked tower assembly to the vertically deployed position.

\* \* \* \* \*